(12) United States Patent
Pozsgay et al.

(10) Patent No.: US 11,064,595 B2
(45) Date of Patent: Jul. 13, 2021

(54) LIGHTING DIMMER MODULE AND METHOD OF CALIBRATION

(71) Applicant: Telkonet, Inc., Waukesha, WI (US)

(72) Inventors: Andrew Pozsgay, Waukesha, WI (US); Jeff Sobieski, Waukesha, WI (US)

(73) Assignee: Telkonet, Inc., Waukesha, WI (US)

( * ) Notice: Subject to any disclaimer, the term of this patent is extended or adjusted under 35 U.S.C. 154(b) by 0 days.

(21) Appl. No.: 16/504,839

(22) Filed: Jul. 8, 2019

(65) Prior Publication Data

US 2020/0022243 A1 Jan. 16, 2020

Related U.S. Application Data

(60) Provisional application No. 62/697,707, filed on Jul. 13, 2018.

(51) Int. Cl.
*H05B 47/19* (2020.01)
*H02M 3/335* (2006.01)

(52) U.S. Cl.
CPC ........ *H05B 47/19* (2020.01); *H02M 3/33523* (2013.01)

(58) Field of Classification Search
CPC ............ H05B 33/0815; H05B 33/0818; H05B 37/02; H05B 41/2828; H05B 33/0827; H05B 33/0845; H05B 33/08; H05B 33/0803; H05B 33/0812; H05B 33/086; H05B 33/0866; H05B 33/0809; H05B 33/0824; H05B 33/083; H05B 33/0884; H05B 33/0887; H05B 33/089; H05B 33/0896; H05B 37/0245

See application file for complete search history.

(56) References Cited

U.S. PATENT DOCUMENTS

2014/0312773 A1* 10/2014 Zulim ...................... H02H 3/00
 315/113
2014/0313643 A1* 10/2014 Westrick, Jr. ......... H02M 5/293
 361/641

* cited by examiner

*Primary Examiner* — Monica C King
(74) *Attorney, Agent, or Firm* — Foley & Lardner LLP

(57) ABSTRACT

A modular dimmer assembly, including a communications circuit configured to send and receive wireless communication, a control circuit configured to receive an AC input at a first pulse width and adjust the brightness of at least one lighting device, in response to the communications circuit receiving a signal, by producing an AC output at a second pulse width, a regulation circuit, controlled by the AC output, including a flyback switch mode power supply (SMPS) and a capacitor, wherein the flyback SMPS charges the capacitor and the control circuit monitors a voltage of the capacitor to determine the second pulse width, and wherein the modular dimmer assembly is a two-wire device.

29 Claims, 10 Drawing Sheets

LIGHTING DIMMER MODULE AND METHOD OF CALIBRATION

CROSS-REFERENCE TO RELATED PATENT APPLICATIONS

The present application claims the benefit and priority of U.S. Provisional Patent Application No. 62/697,707, filed Jul. 13, 2018, the entirety of which is hereby incorporated by reference herein.

TECHNICAL FIELD

The present disclosure relates generally to the field of electronics and, more specifically, to a wirelessly controllable modular dimmer assembly used in conjunction with lighting dimmers suitable for operation in circuits without a neutral wire and a method for calibrating the modular dimmer assembly.

BACKGROUND

With the rise of smart appliances, the ability to control lighting devices wirelessly has become increasingly more desirable. Traditional light dimmers, which cannot be controlled wirelessly, are being replaced with dimmers that are capable of being controlled wirelessly from a remote location. It is typical for the wireless dimmer to be installed in place of a standard single-pole single-throw (SPST) switch, providing radio control but also retaining on/off control via the standard switch. While it is possible to re-wire the already existing lighting system in order to accommodate wireless dimmers, a much more economical option is to install a dimmer that is compatible with the already existing wiring.

SUMMARY

One embodiment of the present disclosure relates to a modular dimmer assembly, including a communications circuit configured to send and receive wireless communication, a control circuit configured to receive an AC input at a first pulse width and adjust the brightness of at least one lighting device, in response to the communications circuit receiving a signal, by producing an AC output at a second pulse width, a regulation circuit, controlled by the AC output, including a flyback switch mode power supply (SMPS) and a capacitor, wherein the flyback SMPS charges the capacitor and the control circuit monitors a voltage of the capacitor to determine the second pulse width, and wherein the modular dimmer assembly is a two-wire device.

In some embodiments, the communication circuit uses a Zigbee communications protocol. In some embodiments, the at least one lighting device is one of a light emitting diode (LED), a compact fluorescent light (CFL), a fluorescent, an incandescent, or a halogen. In some embodiments, the control circuit modifies the AC output based on the lighting device. In some embodiments, the modular dimmer assembly couples to an existing light switch. In some embodiments, the modular dimmer assembly functions in addition to an existing switching functionality of the existing light switch. In some embodiments, the communications circuit wirelessly connects to a control device.

Another embodiment of the present disclosure relates to a method of controlling a modular dimmer assembly. The method including receiving, by a communications circuit of the modular dimmer assembly, a wireless communication to dim a light, generating, by a control circuit of the modular dimmer assembly, a first AC output having a first pulse width, wherein the first AC output controls a flyback switch mode power supply (SMPS) to charge a capacitor, measuring, by a regulation circuit of the modular dimmer assembly, a voltage associated with the capacitor, calculating, by the control circuit, a second pulse width based on an algorithm using the voltage and the wireless communication, and generating, by the control circuit, a second AC output having the second pulse width.

In some embodiments, the wireless communication conforms to a Zigbee communications protocol. In some embodiments, the light is one of a light emitting diode (LED), a compact fluorescent light (CFL), a fluorescent, an incandescent, or a halogen. In some embodiments, the algorithm further uses a type of the light. In some embodiments, the modular dimmer assembly couples to an existing light switch. In some embodiments, the method functions in addition to an existing switching functionality of the existing light switch. In some embodiments, the communications circuit receives the wireless communication from a control device.

Another embodiment of the present disclosure relates to a dimmer to modify a light switch. The dimmer including a coupling unit configured to integrate the dimmer with an AC power source and the light switch, the coupling unit including a first connection and a second connection, the first connection configured to connect to a line source of the AC power source and the second connection configured to connect to a ground source of the AC power source, a communications circuit configured to send and receive wireless communication, a control circuit configured to receive the AC power source at a first pulse width and adjust the brightness of at least one lighting device, in response to the communications circuit receiving a signal, by producing an AC output at a second pulse width, and a regulation circuit, controlled by the AC output, including a flyback switch mode power supply (SMPS) and a capacitor, wherein the flyback SMPS charges the capacitor and the control circuit monitors a voltage of the capacitor to determine the second pulse width.

In some embodiments, the communications circuit uses a Zigbee communications protocol. In some embodiments, the at least one lighting device is one of a light emitting diode (LED), a compact fluorescent light (CFL), a fluorescent, an incandescent, or a halogen. In some embodiments, the control circuit modifies the AC output based on the lighting device. In some embodiments, the light switch is an existing light switch, and wherein the dimmer functions in addition to an existing switching functionality of the light switch. In some embodiments, the communications circuit wirelessly connects to a control device.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Figure 1:
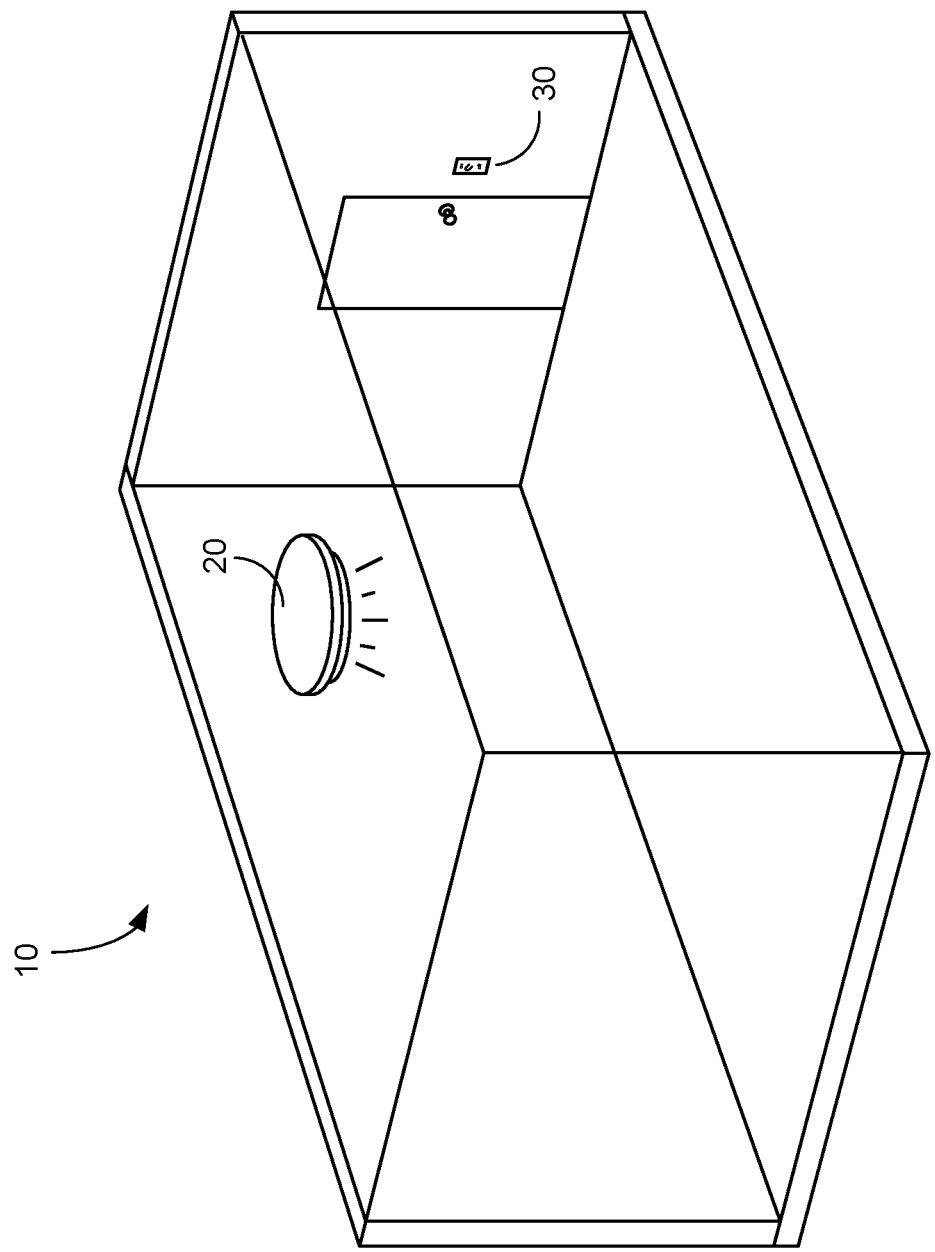
FIG. 1 is a perspective view of a room having a light and a light switch, according to an exemplary embodiment.

Turning now to FIG. 1, room 10 having light 20 and switch 30 is shown, according to an exemplary embodiment. Room 10 may be a hotel room, a residential living space, a warehouse/storage space, and/or any other space having an artificial lighting source (e.g., a fluorescent light, an incandescent light, a light emitting diode ("LED") light, etc.). A user, via switch 30, may turn on (e.g., power, illuminate, etc.) light 20 and turn off (e.g., remove power, darken, etc.) light 20. In various embodiments, switch 30 is coupled to light 20 via one or more wires, forming a circuit. Operation of switch 30 may selectively open and/or close the circuit, thereby controlling illumination of light 20. In typical operation, a user operates switch 30 to turn on light 20 when light is needed. However, in some situations, the user may leave light 20 on when light is not needed (e.g., when the user is not in room 10, etc.), thereby wasting electricity and deteriorating the life of light 20. Therefore, a system is needed to remotely control and/or at least partially automate operation of light 20.

Figure 2:
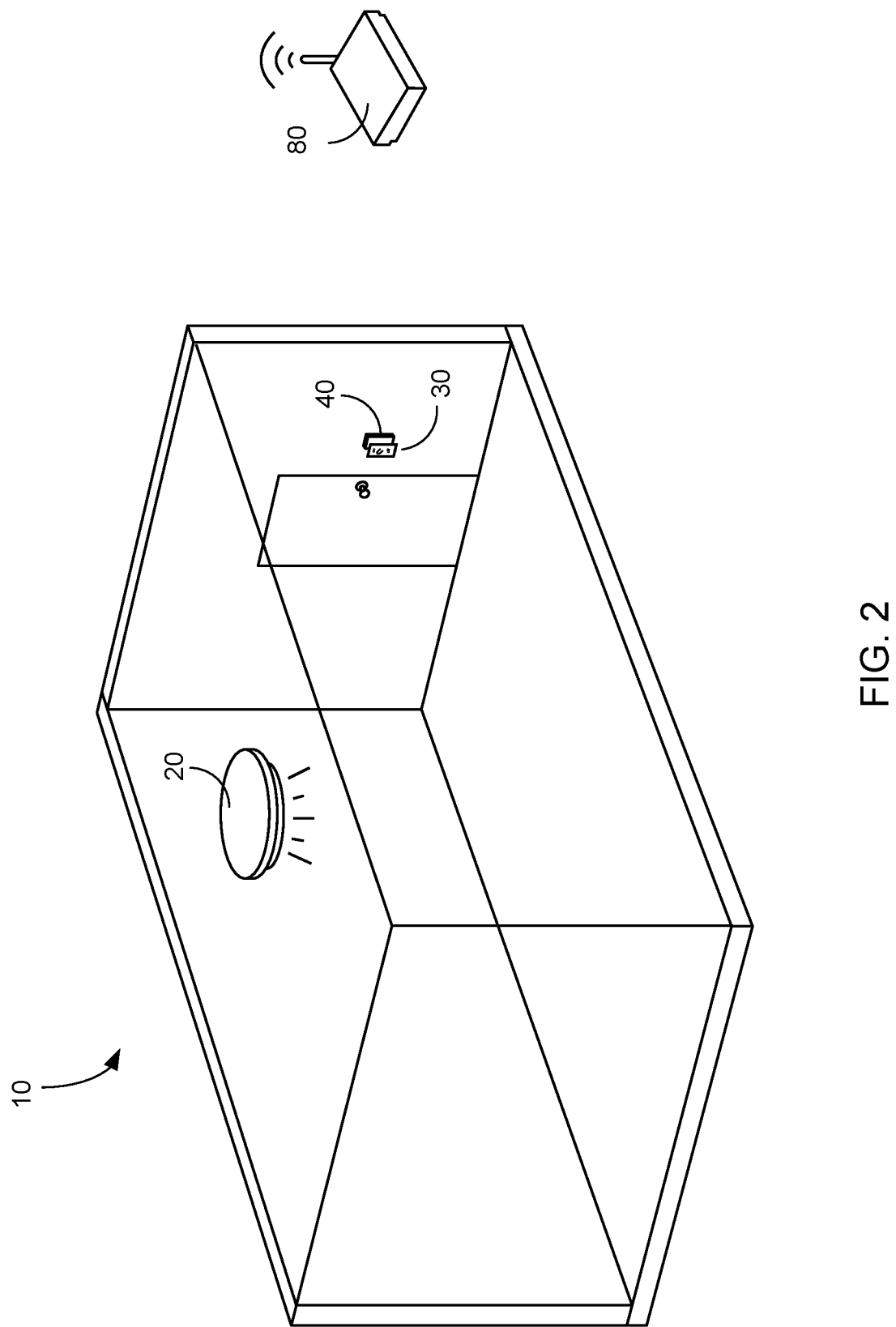
FIG. 2 is a perspective view of the room of FIG. 1 including a wireless dimmer, according to an exemplary embodiment.

Turning now to FIG. 2, room 10 is shown including wireless dimmer 40 and controller 80, according to an exemplary embodiment. Wireless dimmer 40 may be coupled to the circuit connecting switch 30 and light 20 and may be configured to control operation of light 20. In various embodiments, wireless dimmer 40 operates light 20 in response to one or more signals received from controller 80. For example, controller 80 may wirelessly control (e.g., via one or more radio signals, etc.) wireless dimmer 40 to turn off light 20. Controller 80 may be a wireless set-top box. In various embodiments, controller 80 is located remotely (e.g., in a different room, etc.) of wireless dimmer 40. In some embodiments, controller 80 controls a number (e.g., one-hundred, etc.) of wireless dimmers 40.

In some embodiments, switch 30 and/or light 20 includes wireless dimmer 40. Additionally or alternatively, wireless dimmer 40 may be standalone. In some embodiments, wireless dimmer 40 is retrofitted to switch 30 and/or light 20, as described in detail with reference to FIG. 3. For example, wireless dimmer 40 may be added to an existing switch 30 to provide wireless dimming functionality. In the case of a hotel room, wireless dimmer 40 may allow the hotel operator to remotely and/or automatically operate light 20. For example, the hotel operator could turn on light 20 when a guest checks-in, thereby preparing room 10 for the guest.

Figure 3:
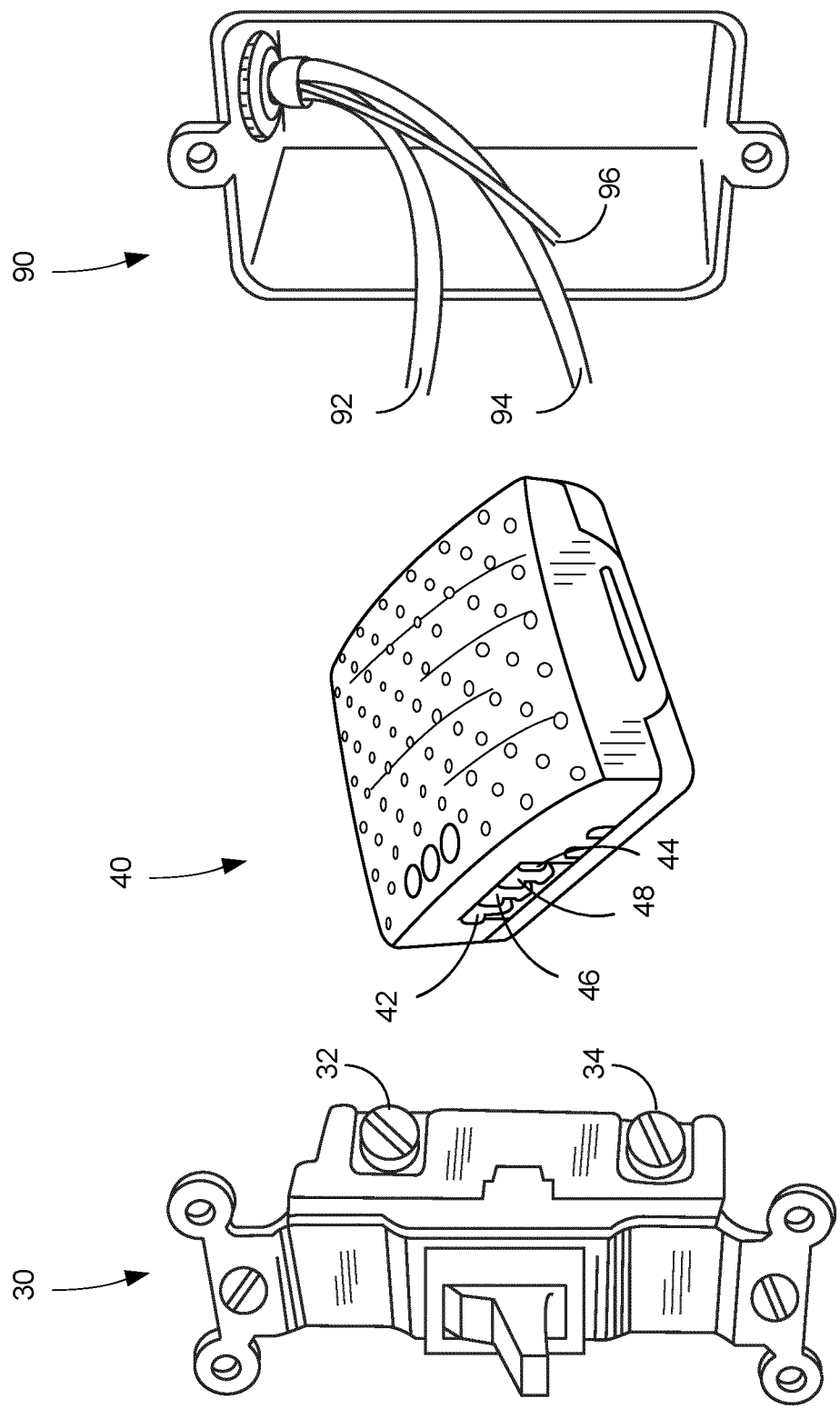
FIG. 3 is a perspective view of the wiring of the light switch and wireless dimmer of FIG. 2, according to an exemplary embodiment.
Figure 3A:
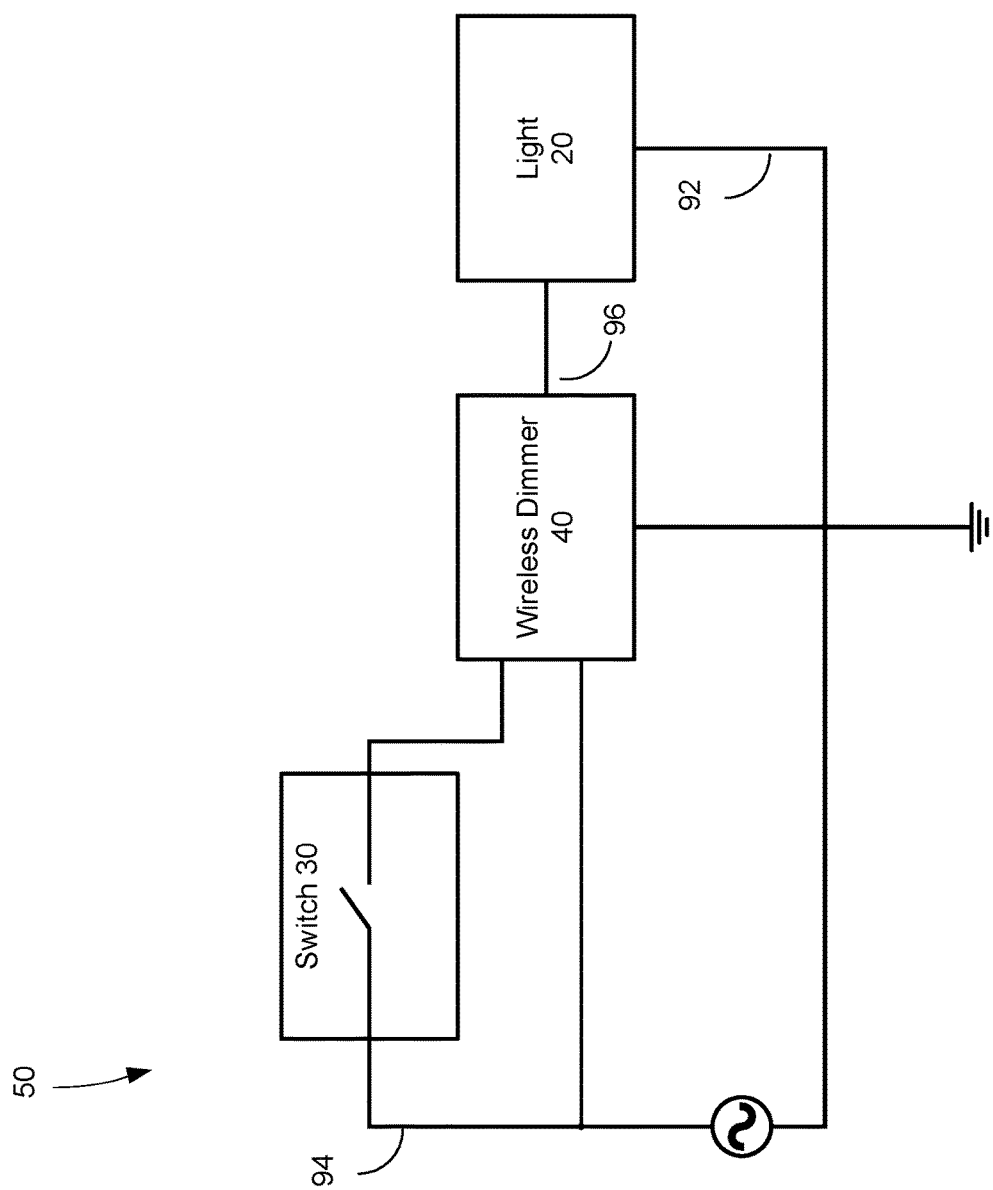
FIG. 3A is a schematic diagram of the wiring of the light switch and wireless dimmer of FIG. 3, according to an exemplary embodiment.

Referring now generally to FIGS. 3-3A, installation/connection of wireless dimmer 40 is described. In various embodiments, wireless dimmer 40 may be retrofitted to an existing light switch circuit. For example, wireless dimmer 40 may be installed between switch 30 and light 20. Referring now specifically to FIG. 3, junction box 90 is shown, according to an exemplary embodiment. Junction box 90 may provide a connection to mains electricity (e.g., 120V 60 Hz AC grid power, earth ground, etc.) and/or one or more loads (e.g., lights, etc.). Junction box 90 is shown as a single-gang junction box, however it should be understood that junction box 90 may be any electrical receptacle suitable for receiving electrical components and/or enclosing electrical wiring. Junction box 90 is shown to include ground 92, hot 94, and load 96. Ground 92 may connect to electrical ground. Hot 94 may connect to a source of electrical potential (e.g., 120V 60 Hz AC grid power, etc.). Load 96 may connect to one or more electrical loads (e.g., a light, etc.). In some embodiments, junction box 90 includes a neutral wire. Although FIGS. 3-3A are described in terms of ground 92 and hot 94, it should be understood that any of the wiring described herein may be adapted to include a neutral wire. For example, wireless dimmer 40 operates with or without a neutral wire connection.

Still referring to FIG. 3, switch 30 is shown to include input 32 and output 34. Further, wireless dimmer 40 is shown to include connections 42-48. In some embodiments, switch 30 and/or wireless dimmer 40 include a different number and/or type of connections. For example, wireless dimmer 40 may include a neutral connection.

Referring now to FIG. 3A, a schematic 50 of the connections of light 20, switch 30, and wireless dimmer 40 is shown, according to an exemplary embodiment. Hot 94 may connect to switch 30 (e.g., via input 32) and wireless dimmer 40 (e.g., via connection 42). In some embodiments, output 34 of switch 30 is connected to wireless dimmer 40 (e.g., via connection 48). Load 96 may connect to wireless dimmer 40 (e.g., via connection 46) and light 20. Ground 92 may connect to wireless dimmer 40 (e.g., via connection 44) and light 20. In various embodiments, a different wiring layout is used.

Figure 4:
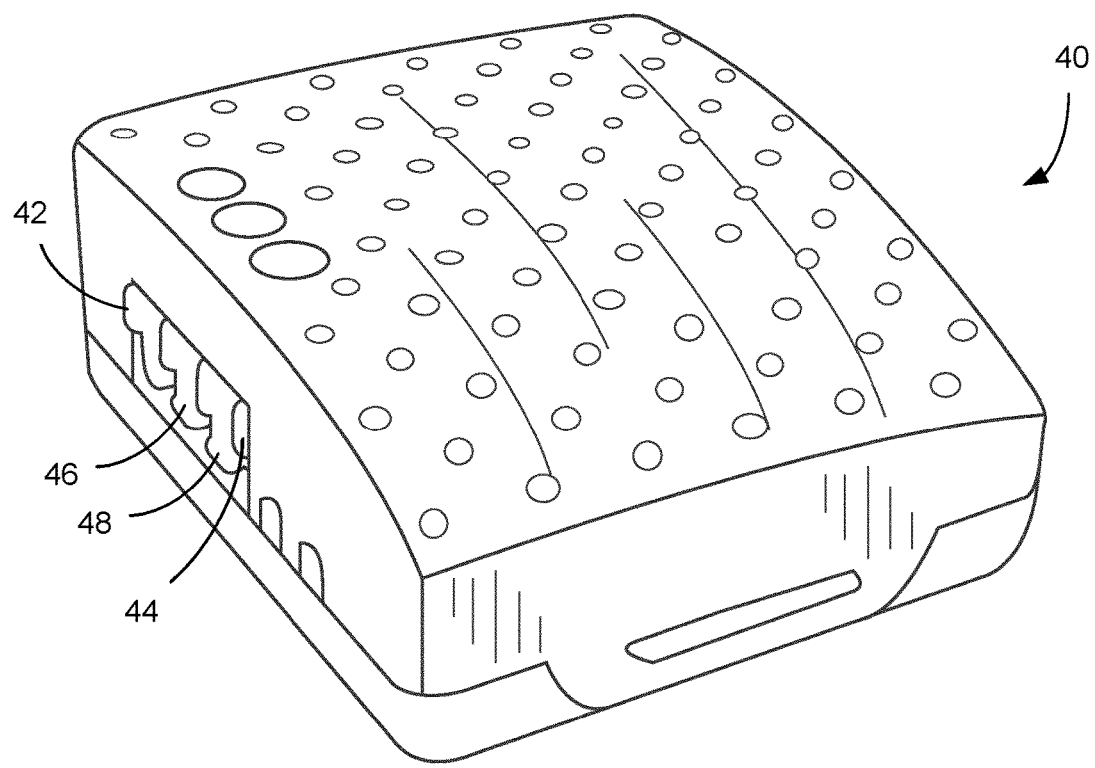
FIG. 4 is a perspective view of the wireless dimmer of FIG. 3, according to an exemplary embodiment.
Figure 5:
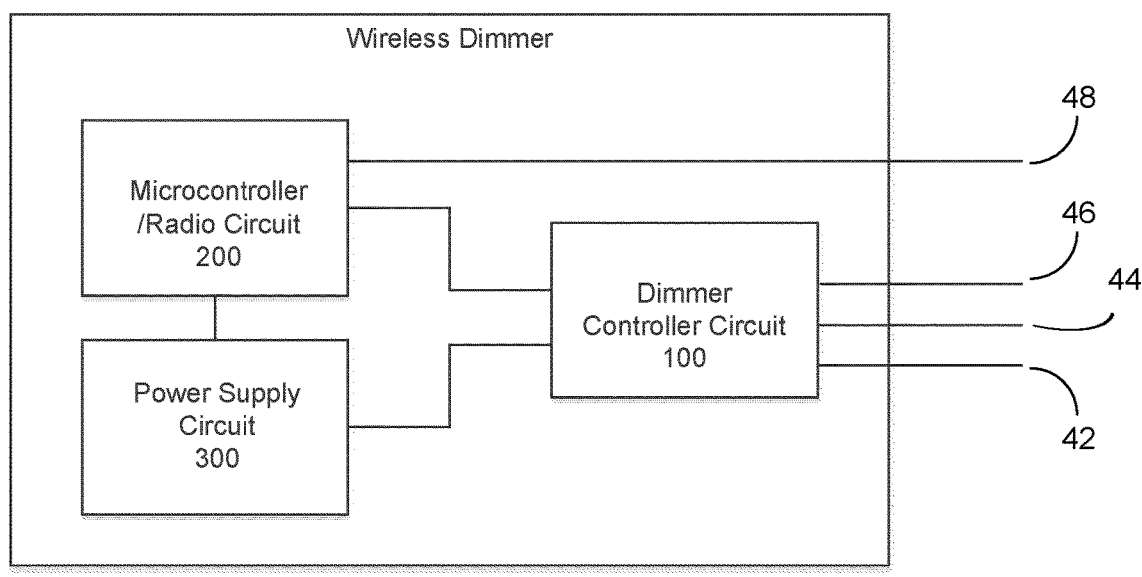
FIG. 5 is a block diagram of the wireless dimmer of FIG. 4, according to an exemplary embodiment.

Turning now to FIGS. 4-5, wireless dimmer 40 is shown, according to an exemplary embodiment. Wireless dimmer 40 is shown to include dimmer controller circuit 100, microcontroller/radio circuit 200, and power supply circuit 300. In some embodiments, wireless dimmer 40 includes a different number and/or type of components. Dimmer controller circuit 100 may provide power to the load (e.g., light 20, etc.). Dimmer controller circuit 100 may adjust one or more characteristics of the power (e.g., an AC duty cycle, etc.) delivered to light 20 to control operation (e.g., turn on, turn off, dim, etc.) of light 20. Dimmer controller circuit 100 is described in greater detail with reference to FIG. 6. Microcontroller/radio circuit 200 may receive one or more control signals and control the operation of dimmer controller circuit 100 based on the one or more control signals. In various embodiments, microcontroller/radio circuit 200 receives wireless control signals (e.g., radio signals, etc.) from controller 80. Additionally or alternatively, microcontroller/radio circuit 200 may receive a signal from switch 30 (e.g., via connection 48) to control operation of dimmer controller circuit 100. For example, dimmer controller circuit 100 may turn on light 20 in response to microcontroller/radio circuit 200 receiving a signal from controller 80, and subsequently turn off light 20 in response to microcontroller/radio circuit 200 receiving a signal from switch 30. Microcontroller/radio circuit 200 is described in greater detail with reference to FIG. 7.

Power supply circuit 300 may provide power for dimmer controller circuit 100, microcontroller/radio circuit 200, and/or any other components of wireless dimmer 40. In some embodiments, power supply circuit 300 is a switch mode power supply ("SMPS"). For example, power supply circuit 300 may be a flyback SMPS. Additionally or alternatively, power supply circuit 300 may be any type of SMPS and/or any other power supply circuit known in the art. Power supply circuit 300 is described in greater detail with reference to FIG. 8.

Figure 6:
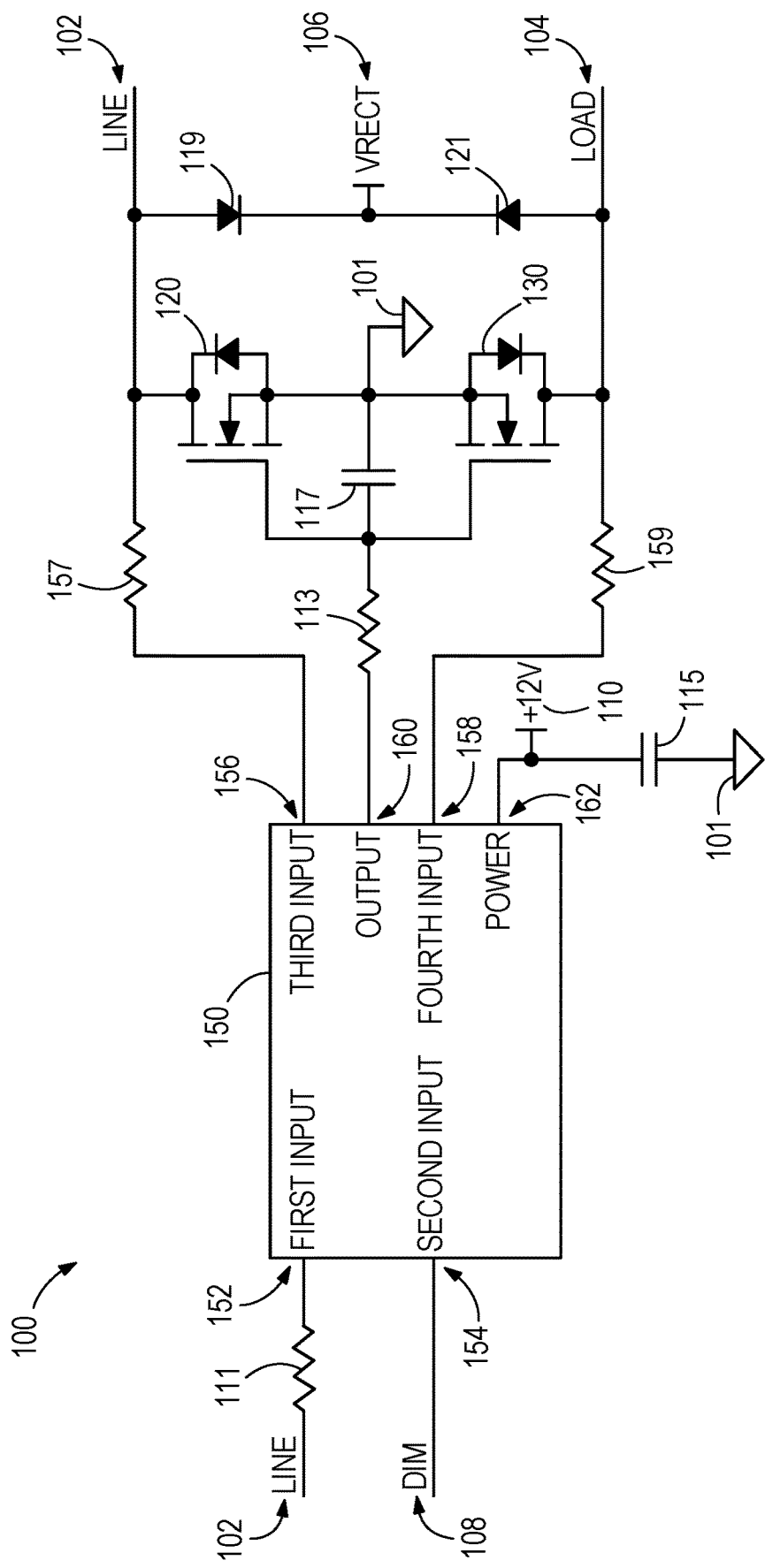
FIG. 6 is a schematic diagram of a dimmer controller circuit, according to an exemplary embodiment.

Referring now to FIG. 6, a schematic diagram of dimmer controller circuit 100 is shown, according to an exemplary embodiment. Speaking generally, dimmer controller circuit 100 acts as a high-frequency switch for light 20. Dimmer controller circuit 100 may dim light 20 by adjusting a duty cycle of an AC source supplying light 20. For example, dimmer controller circuit 100 may increase a brightness of light 20 by increasing the duty cycle of the source supplying light 20. Dimmer controller circuit 100 may generate a pulse width modulated ("PWM") signal that controls the connection between an AC source and light 20, determining an amount of time light 20 is connected to the AC source, thereby dimming and/or brightening light 20.

Dimmer controller circuit 100 includes a number of external connections. In various embodiments, LINE 102 receives an AC source signal via hot 94. LOAD 104 may be connected to one or more loads (e.g., light 20, etc.). VRECT 106 may be connected to power supply circuit 300. DIM 108 may connect to microcontroller/radio circuit 200. 12-volt connection 110 may be connected to power supply circuit 300. In some embodiments, power supply circuit 300 provides a 12 volt source to dimmer controller circuit 100 via 12-volt connection 110. Dimmer controller circuit 100 may further include electrical ground 101.

Dimmer controller circuit 100 is shown to include dimmer controller 150 and a number of switching components, shown as metal-oxide semiconductor field-effect transistors ("MOSFETs") 120-130. In some embodiments, the switching components are a different type of switching component than MOSFETs 120-130 (e.g., field-effect transistor ("FET"), bipolar junction transistor ("BJT"), power diode, insulated gate bipolar transistor ("IGBT"), silicon controller rectifier ("SCR"), triode AC switch ("TRIAC"), gate turn-off thyristor ("GTO"), etc.). In various embodiments, MOSFETs 120-130 include one or more body diodes.

Dimmer controller 150 operates MOSFETs 120-130 in response to one or more control signals. In some embodiments, dimmer controller 150 is the FL5160 "IGBT and MOSFET AC Phase Cut Dimmer Controller" from ON Semiconductor. In some embodiments, dimmer controller 150 is a different component or a different combination of components.

Dimmer controller 150 includes inputs 152-158 and output 160. In various embodiments, dimmer controller 150 includes a different number, type, and/or combination of connections (e.g., additional inputs, additional outputs, etc.). Output 160 is a PWM signal to control MOSFETs 120-130. The PWM signal may drive a gate terminal of MOSFETs 120-130, thereby controlling the flow of current between LINE 102 and LOAD 104 and controlling the illumination of light 20. In various embodiments, dimmer controller 150 further includes power 162 to provide operating power for dimmer controller 150. Power 162 may receive a 12 volt supply (e.g., via 12-volt connection 110) from power supply circuit 300.

First input 152 may receive LINE 102 to determine a zero-crossing of the associated AC source. Dimmer controller 150 may use the zero-crossing to sync the PWM signal from output 160 with the AC source. Second input 154 may receive DIM 108. In various embodiments, second input 154 determines a magnitude of dimming produced by dimmer controller 150. For example, a low DIM 108 signal may result in a highly dimmed light 20, while a high DIM 108 signal may result in a bright/undimmed light 20. Third input 156 and fourth input 158 may be connected to MOSFETs 120 and 130 respectively. In various embodiments, third input 156 and fourth input 158 measure a drain voltage of the associated MOSFETs 120-130. The drain voltage can be used by dimmer controller 150 to determine an amount of current flowing through MOSFETs 120-130 and/or to detect an over-current condition. In various embodiments, third input 156 and fourth input 158 include resistors, shown as first resistor 157 and second resistor 159.

Dimmer controller circuit 100 may further include one or more additional components 111-121. For example, dimmer controller circuit 100 may include resistors 111 and 113, capacitors 115 and 117 and/or diodes 119 and 121. Additionally or alternatively, it should be understood that any of the components described in reference to dimmer controller circuit 100 may be replaced, supplemented, and/or removed. For example, resistor 111 may be replaced by two series resistors of half the value of resistor 111 to achieve an equivalent resistance.

Figure 7:
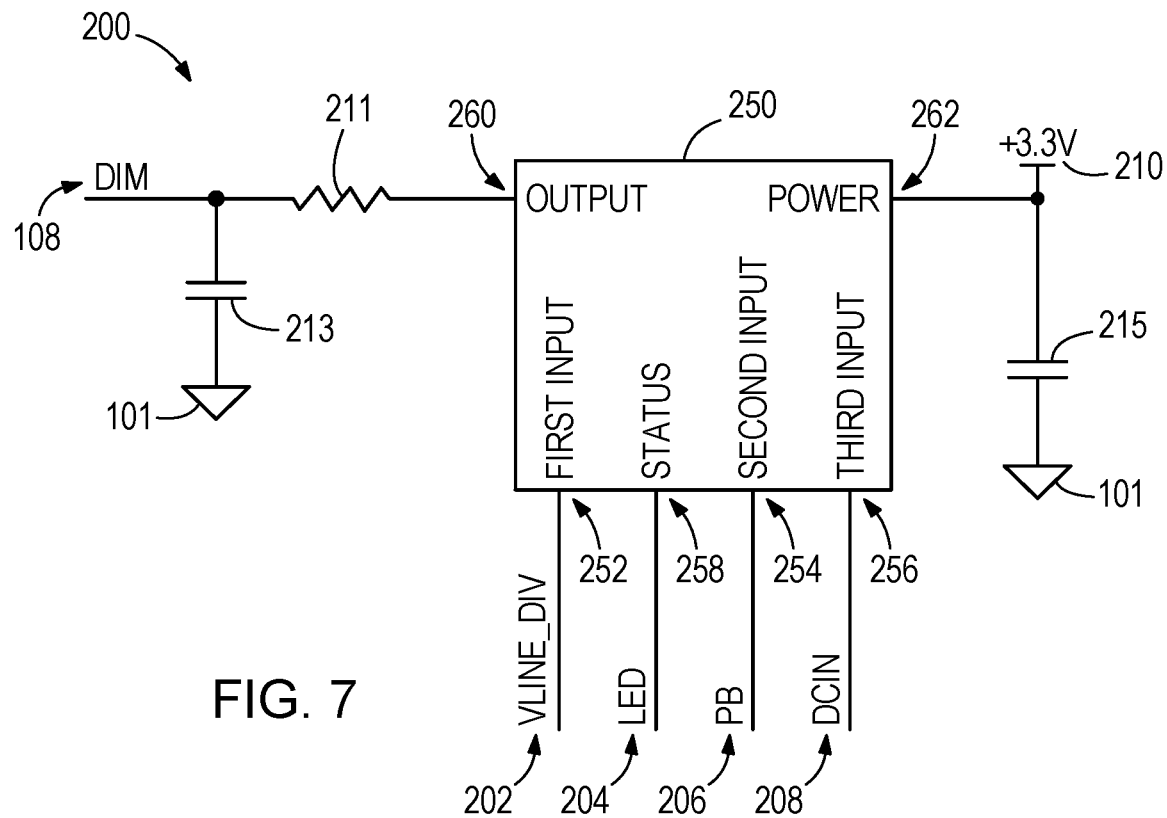
FIG. 7 is a schematic diagram of a microcontroller/radio circuit, according to an exemplary embodiment.

Turning now to FIG. 7, microcontroller/radio circuit 200 is shown, according to an exemplary embodiment. Speaking generally, microcontroller/radio circuit 200 receives one or more control signals and generates a control signal for dimmer controller circuit 100. For example, microcontroller/radio circuit 200 may receive a control signal from controller 80 and cause dimmer controller circuit 100 to dim light 20 in response. Microcontroller/radio circuit 200 may receive and/or transmit wirelessly according to a variety of transmission standards (e.g., Bluetooth, Z-wave, Zigbee, Wi-Fi, etc.). In various embodiments, microcontroller/radio circuit 200 may monitor operation of wireless dimmer 40. For example, microcontroller/radio circuit 200 may monitor a power consumption of light 20 and control one or more components of wireless dimmer 40 to limit the power consumption of light 20. Further, in various embodiments, microcontroller/radio circuit 200 may calibrate operation of wireless dimmer 40 to different lighting sources. A method of calibration is described in detail below with reference to FIG. 12.

Microcontroller/radio circuit 200 is shown to include a number of external connections. In various embodiments, VLINE_DIV 202 receives a voltage measurement from voltage divider circuit 500, as described in detail below with reference to FIG. 10. LED 204 may be connected to indicator circuit 280, as described in detail below with reference to FIG. 7A. PB 206 may be connected to input circuit 290. DCIN 208 may be connected to switch 30 (e.g., via connection 48). 3.3-volt connection 210 may be connected to linear regulator circuit 400. In some embodiments, linear regulator circuit 400 provides a 3.3 volt source to microcontroller/radio circuit 200 via 3.3-volt connection 210. In various embodiments, microcontroller/radio circuit 200 includes electrical ground 101.

Microcontroller/radio circuit 200 is shown to include microcontroller/radio 250. Microcontroller/radio 250 may communicate with controller 80 and control the operation of wireless dimmer 40. In some embodiments, microcontroller/radio 250 is the MGM111 "Mighty Gecko Mesh Networking Module" from Silicon Labs. In some embodiments, microcontroller/radio 250 is a different component or a different combination of components.

Microcontroller/radio 250 includes inputs 252-256, status 258, output 260, and power 262. In some embodiments, microcontroller/radio 250 includes a different number, type, and/or combination of connections. Output 260 is a control signal to control dimmer controller circuit 100. In various embodiments, output 260 is a variable voltage signal that indicates an amount of dimming for light 20. Output 260 may be connected to DIM 108. Power 262 may provide power for microcontroller/radio 250. In various embodiments, linear regulator circuit 400 provides a 3.3 volt source to microcontroller/radio 250 via 3.3-volt connection 210.

In some embodiments, status 258 is connected to LED 204 and may indicate an operational status of microcontroller/radio 250. For example, status 258 may cause an LED to illuminate to indicate wireless dimmer 40 is functioning properly. First input 252 may be connected to VLINE_DIV 202 and may receive a feedback signal from power supply circuit 300. In various embodiments, microcontroller/radio 250 measures an amount of power available to components of wireless dimmer 40 (e.g., dimmer controller circuit 100, microcontroller/radio circuit 200, power supply circuit 300, etc.) and adjusts a dimming level of light 20 in response. For example, if light 20 is driven at 100% power (e.g., a 100% duty cycle, etc.) it may starve wireless dimmer 40 of power. Therefore, microcontroller/radio 250 may reduce an amount of power (e.g., adjust the PWM signal of dimmer controller circuit 100) provided to light 20.

In some embodiments, second input 254 is used to reset microcontroller/radio 250 and/or wireless dimmer 40. For example, a user may reset wireless dimmer 40 by pressing a button to generate a signal that is received via second input 254, causing the wireless dimmer 40 to reset. Additionally or alternatively, second input 254 may initiate a calibration process. For example, a user may press a button to calibrate wireless dimmer 40 whenever a new light 20 is connected. A method of calibrating wireless dimmer 40 is described below with reference to FIG. 12. In some embodiments, third input 256 receives input from switch 30. For example, third input 256 may indicate if switch 30 is in an on or an off position. In some embodiments, wireless dimmer 40 operates light 20 in response to input from third input 256. For example, third input 256 may override an existing dimming level of wireless dimmer 40 to turn off light 20.

Microcontroller/radio circuit 200 may further include one or more additional components 211-215. For example, microcontroller/radio circuit 200 may include resistor 211, and/or capacitors 213 and 215. It should be understood that microcontroller/radio circuit 200 may include a different number, type, and/or combination of components. For example, inputs 252-256 may each include an external resistor to bring an external signal into an acceptable measurement range for microcontroller/radio 250.

Figure 7A:
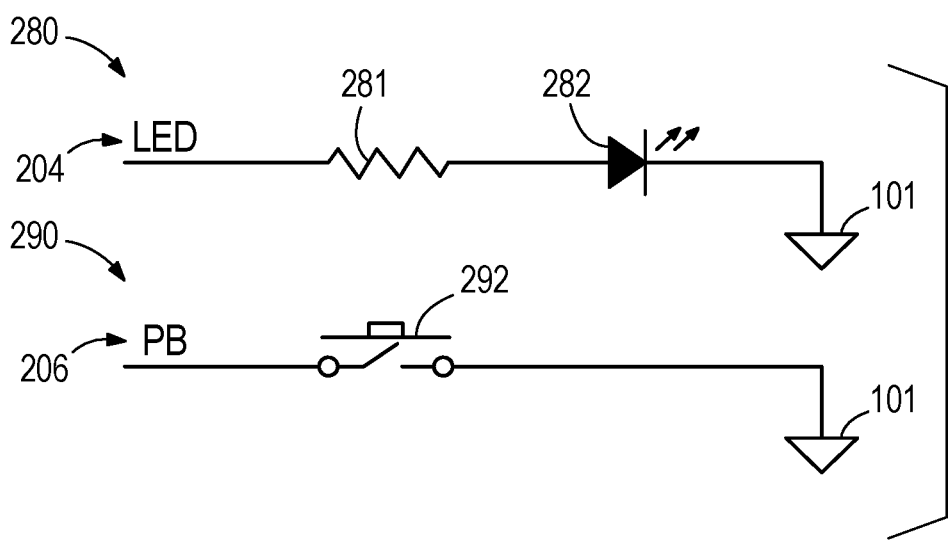
FIG. 7A is a schematic diagram of components of the microcontroller/radio circuit of FIG. 7, according to an exemplary embodiment.

Turning now to FIG. 7A, indicator circuit 280 and input circuit 290 are shown, according to an exemplary embodiment. Indicator circuit 280 may indicate an operational state of wireless dimmer 40. For example, indicator circuit 280 may illuminate an LED in a red color when wireless dimmer 40 is non-operational and may illuminate an LED in a green color when wireless dimmer 40 is operational. Indicator circuit 280 is shown to include LED 282. In some embodiments, LED 282 is a multicolor LED. Additionally or alternatively, indicator circuit 280 may include a different number, type, and/or combination of light emitting components. In some embodiments, indicator circuit 280 includes resistor 281 and/or electrical ground 101.

In various embodiments, input circuit 290 receives user input to control wireless dimmer 40. For example, a user may press a button to reset wireless dimmer 40 via input circuit 290. Input circuit 290 is shown to include push button 292. In some embodiments, input circuit 290 includes electrical ground 101. In some embodiments, push button 292 is located on an external surface of wireless dimmer 40. In some embodiments, wireless dimmer 40 does not include indicator circuit 280 and/or input circuit 290.

Figure 8:
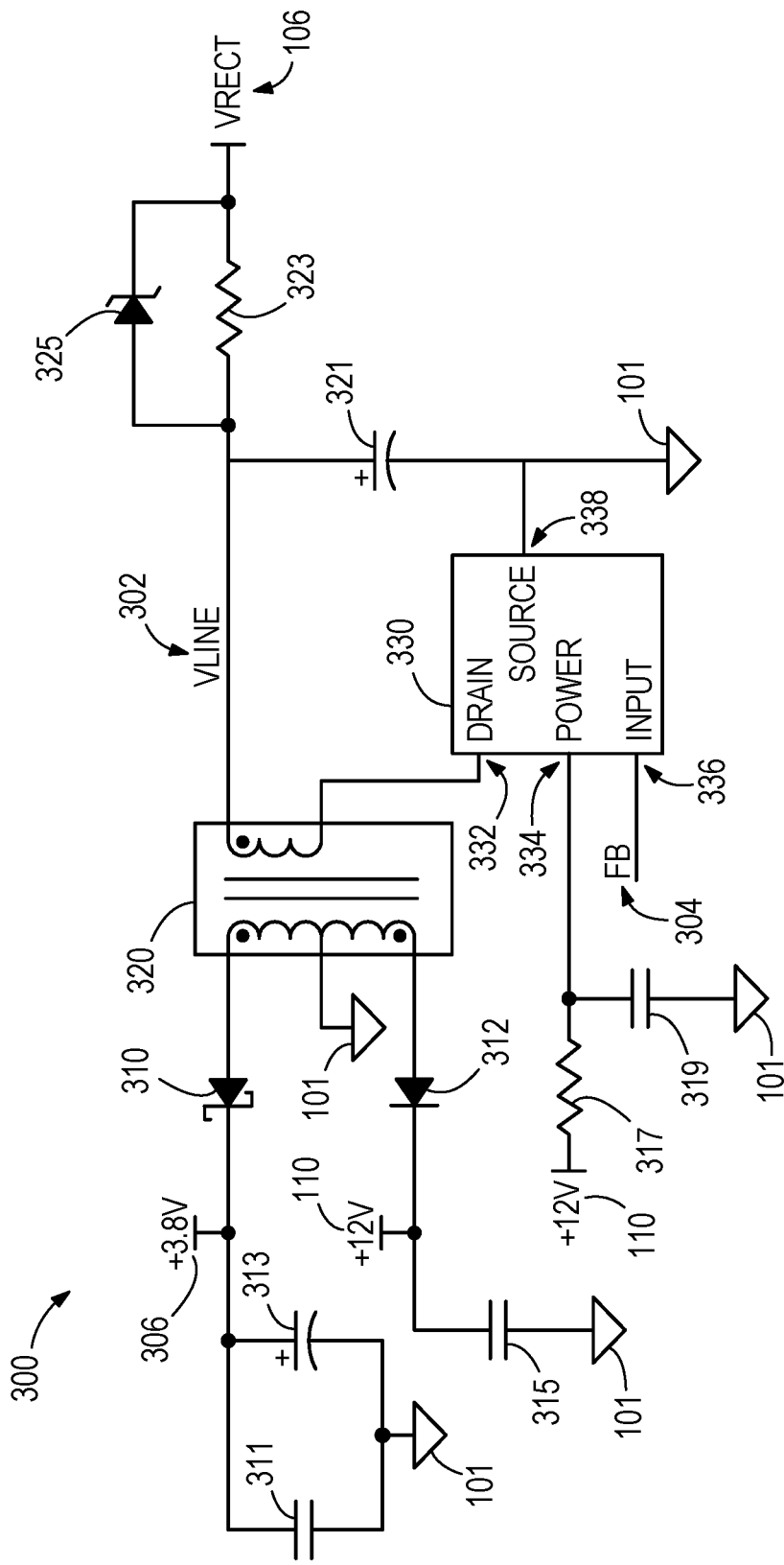
FIG. 8 is a schematic diagram of a power supply circuit, according to an exemplary embodiment.

Referring now to FIG. 8, power supply circuit 300 is shown, according to an exemplary embodiment. Power supply circuit 300 may provide power for one or more components of wireless dimmer 40. In various embodiments, power supply circuit 300 provides a 3.8 volt and/or a 12 volt output. Power supply circuit 300 may have a flyback converter topology. In various embodiments, power supply circuit 300 converts an AC input source into one or more DC output sources suitable for powering one or more digital integrated circuits (e.g., dimmer controller 150, microcontroller/radio 250, etc.).

Power supply circuit 300 is shown to include a number of external connections. In some embodiments, VLINE 302 connects to voltage divider circuit 500. VLINE 302 may provide a feedback path for microcontroller/radio circuit 200. In some embodiments, FB 304 connects to feedback circuit 380. FB 304 may provide a feedback path for one or more components of power supply circuit 300. 3.8-volt connection 306 may connect to linear regulator circuit 400. In some embodiments, power supply circuit 300 includes electrical ground 101.

Power supply circuit 300 includes transformer 320 and converter 330. In some embodiments, transformer 320 is a ferrite core transformer. Transformer 320 may receive VLINE 302 and/or a connection to converter 330. In various embodiments, transformer 320 produces a 3.8 volt and/or a 12 volt output. In some embodiments, the one or more outputs (e.g., 3.8-volt connection 306, 12-volt connection 110, etc.) of transformer 320 are connected via one or more diodes 310-312. Diodes 310-312 may rectify the AC signal to produce a DC signal. Converter 330 may couple to transformer 320 and control operation of transformer 320. In some embodiments, converter 330 is a LNK3202 "LinkSwitch-TN2 Family Switcher IC" from Power Integrations. In some embodiments, converter 330 is a different component or a different combination of components.

Converter 330 may include drain 332, power 334, input 336, and source 338. In some embodiments, converter 330 includes a different number, type, and/or combination of connections. Drain 332 may provide internal operating current for converter 330. In various embodiments, drain 332 is connected to transformer 320. Power 334 may provide power for converter 330. In various embodiments, power 334 is connected to 12-volt connection 110. Input 336 may receive feedback to control the operation of converter 330. In various embodiments, input 336 is connected to FB 304. Source 338 may provide a ground reference for converter 330. In various embodiments, source 338 is connected to electrical ground. In some embodiments, source 338 provides a discharge pathway for a capacitor to discharge through transformer 320.

Power supply circuit 300 may further include one or more additional components 311-325. For example, power supply circuit 300 may include resistors 317 and 323, capacitors 311, 313, 315, 319, and 321, and/or diode 325. It should be understood that power supply circuit 300 may include a different number, type, and/or combination of components. For example, a diode (e.g., diode 312) may be replaced by a Zener diode.

In various embodiments, VRECT 106 passively charges capacitor 321. Converter 330 may allow current to flow between drain 332 and source 338, thereby discharging capacitor 321 through transformer 320 and generating one or more outputs.

Figure 8A:
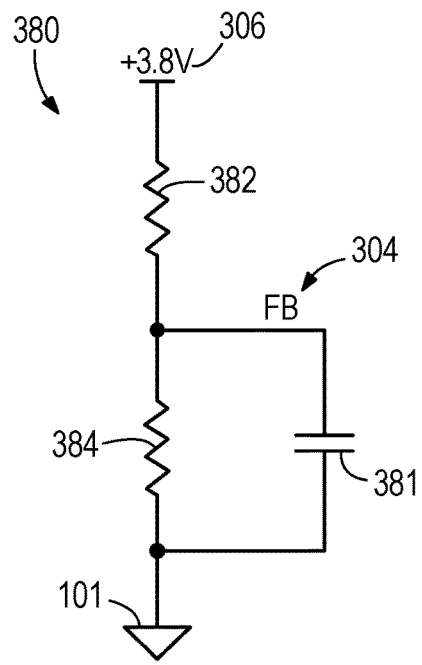
FIG. 8A is a schematic diagram of a component of the power supply circuit of FIG. 8, according to an exemplary embodiment.

Turning now to FIG. 8A, feedback circuit 380 is shown, according to an exemplary embodiment. Feedback circuit 380 may provide a source of feedback (e.g., FB 304) for power supply circuit 300. In various embodiments, feedback circuit 380 includes resistors 382-384 configured as a voltage divider. Resistors 382-384 may reduce a voltage of 3.8-volt connection 306 to a measurable value for converter 330. In some embodiments, feedback circuit 380 includes capacitor 381 and/or electrical ground 101.

Figure 9:
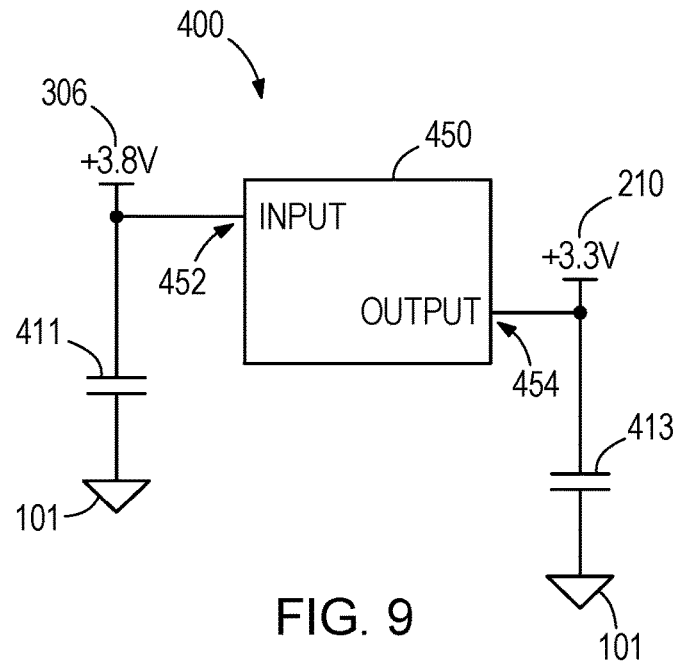
FIG. 9 is a schematic diagram of a linear converter circuit, according to an exemplary embodiment.

Referring now to FIG. 9, linear regulator circuit 400 is shown, according to an exemplary embodiment. Linear regulator circuit 400 may receive an input voltage and convert the input voltage into a different output voltage. For example, linear regulator circuit 400 may receive a 3.8 volt input and produce a 3.3 volt output. In various embodiments, linear regulator circuit 400 receives 3.8-volt connection 306 from power supply circuit 300 and connects to microcontroller/radio circuit 200 via 3.3-volt connection 210. Linear regulator circuit 400 is shown to include linear regulator 450. In some embodiments, linear regulator 450 is the TCR2EE series "CMOS single-output voltage regulator" from Toshiba. In some embodiments, linear regulator 450 is a different component and/or a different combination of components. In some embodiments, linear regulator circuit 400 includes electrical ground 101.

Linear regulator 450 includes input 452 and output 454. In some embodiments, linear regulator 450 includes a different number, type, and/or combination of connections. Input 452 may receive a first voltage and output 454 may produce a second voltage. For example, linear regulator 450 may receive a 3.8 volt signal via input 452 and produce a 3.3 volt signal via output 454. Linear regulator 450 may be a DC converter. In some embodiments, wireless dimmer 40 does not include linear regulator circuit 400.

Linear regulator circuit 400 may further include one or more additional components 411-413. For example, linear regulator circuit 400 may include capacitors 411 and 413. It should be understood that linear regulator circuit 400 may include a different number, type, and/or combination of components. For example, capacitor 413 may be replaced by two parallel capacitors of half the capacitance of capacitor 413 to achieve an equivalent capacitance of capacitor 413.

Figure 10:
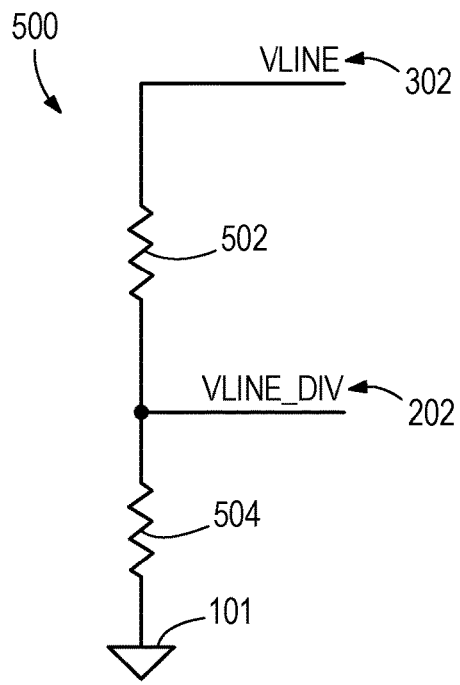
FIG. 10 is a schematic diagram of a voltage divider circuit, according to an exemplary embodiment.

Turning now to FIG. 10, voltage divider circuit 500 is shown, according to an exemplary embodiment. Voltage divider circuit 500 includes one or more resistors 502-504. In various embodiments, resistors 502-504 are configured as a voltage divider. Resistors 502-504 may reduce a voltage of VLINE 302 to a measurable value for microcontroller/radio circuit 200. In various embodiments, voltage divider circuit 500 receives a first voltage via VLINE 302 and produces a second lower voltage via VLINE_DIV 202. In some embodiments, voltage divider circuit 500 includes electrical ground 101.

Figure 11:
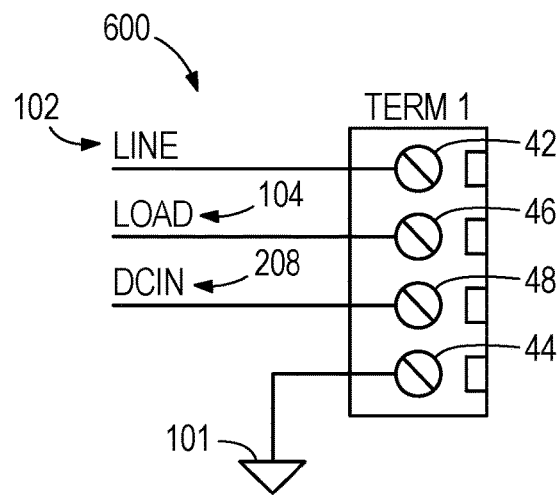
FIG. 11 is a schematic view of a terminal block, according to an exemplary embodiment.

Referring now to FIG. 11, terminal block 600 is shown, according to an exemplary embodiment. Terminal block 600 may be the external connections to wireless dimmer 40. Terminal block 600 may include connections 42-48. Connection 42 may connect to LINE 102. Connection 44 may connect to electrical ground 101. Connection 46 may connect to LOAD 104. Connection 48 may connect to DCIN 208.

Figure 12:
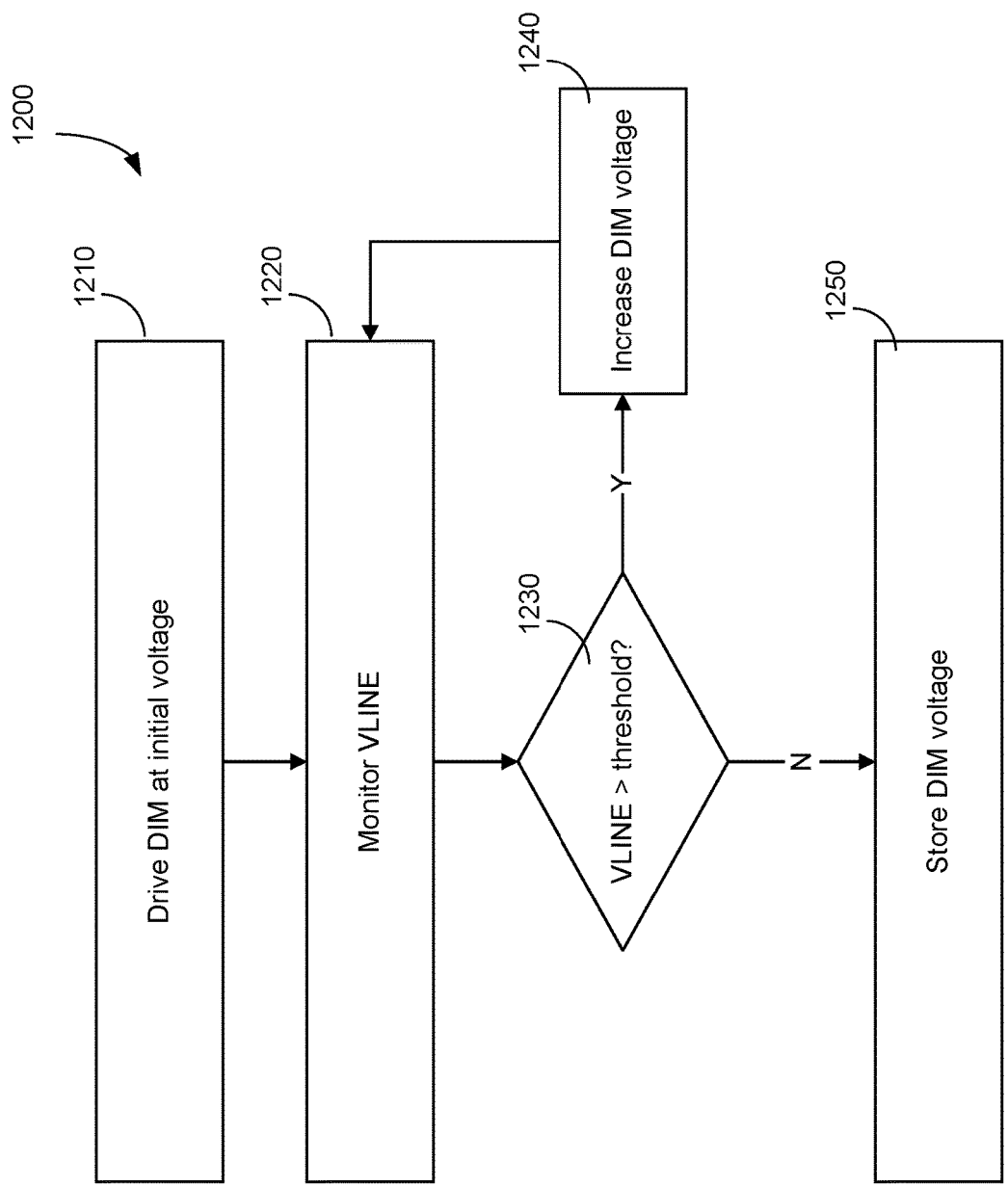
FIG. 12 is a flow diagram of a method of calibration, according to an exemplary embodiment.

Referring now generally to FIG. 12, a method 1200 of calibrating wireless dimmer 40 is shown, according to an exemplary embodiment. Method 1200 may adjust the operation of wireless dimmer 40 to accommodate a variety of light sources. In various embodiments, method 1200 ensures consistent operation of wireless dimmer 40 for users. For example, a first incandescent lighting source may have a first current draw and therefore a first brightness associated with a first dimming level. If a user replaces the first incandescent lighting source with a second LED lighting source having a second current draw that is less than the first current draw, then a second brightness associated with the second LED lighting source at the first dimming level may be significantly greater than the first brightness associated with the first incandescent lighting source at the first dimming level. Accordingly, method 1200 may ensure a uniform dimming experience across lighting sources. Furthermore, method 1200 may ensure that wireless dimmer 40 doesn't starve itself of power. For example, in various embodiments, wireless dimmer 40 and light 20 are powered from the same source (e.g., a household AC connection, etc.) and if wireless dimmer 40 provides the entire source to light 20 then there will be no power left to power the components of wireless dimmer 40.

In various embodiments, method 1200 is performed by microcontroller/radio 250. However, while method 1200 is described in reference to microcontroller/radio 250, it should be understood that method 1200 may be performed by any other component and/or combination of components. For example, microcontroller/radio 250 may be two separate components (e.g., a microcontroller and a radio). In some embodiments, method 1200 is initiated at the startup of wireless dimmer 40 (e.g., when wireless dimmer 40 is powered on). Additionally or alternatively, wireless dimmer 40 may detect when a new lighting source is connected and then initiate method 1200. In some embodiments, method 1200 is initiated by controller 80. Additionally or alternatively, method 1200 may be initiated by a user (e.g., via push button 292, etc.).

At step 1210, microcontroller/radio 250 drives DIM 108 at an initial voltage. In various embodiments, the initial voltage is below 150 mV. Driving DIM 108 at an initial voltage causes dimmer controller 150 to switch MOSFETs 120-130, powering light 20 at a low power (e.g., a low duty cycle). At step 1220, microcontroller/radio 250 monitors VLINE 302. In various embodiments, microcontroller/radio 250 receives a lower voltage version of VLINE 302 via VLINE_DIV 202 from voltage divider circuit 500. In some embodiments, microcontroller/radio 250 measures VLINE 302 directly. VLINE 302 may represent a portion of the total available source power (e.g., LINE 102) not being used by light 20 and therefore available to power the components of wireless dimmer 40.

At step 1230, microcontroller/radio 250 determines if VLINE 302 is greater than a threshold value. The threshold value may represent a voltage at which light 20 is using a majority of the total available source power and therefore an insufficient amount of power is available for powering the components of wireless dimmer 40. If VLINE 302 is greater than the threshold (e.g., the result of step 1230 is "Y"), then microcontroller/radio 250 increases the voltage of DIM 108 (e.g., step 1240). Increasing the voltage of DIM 108 causes dimmer controller 150 to switch MOSFETs 120-130, powering light 20 at a higher power (e.g., a higher duty cycle) than in step 1210.

Steps 1220-1240 continue until microcontroller/radio 250 determines VLINE 302 is less than the threshold (e.g., the result of step 1230 is "N"), then microcontroller/radio 250 stores the value of DIM 108 (e.g., step 1250). The stored value of DIM 108 may represent a maximum brightness/power of light 20 (e.g., a maximum duty cycle). In some embodiments, microcontroller/radio 250 may calculate the intermediate dimming levels (e.g., dimming levels between off and the stored value of DIM 108, step size between dimming levels, etc.) and store the intermediate dimming levels in a table. Therefore, when microcontroller/radio 250 receives a request to increase and/or decrease a brightness of light 20 it drives DIM 108 according to the voltage associated with the desired brightness level.

The systems and methods of the present disclosure provide many benefits over existing solutions. Firstly, traditional dimmers include a number of integrated circuits ("ICs") that require a neutral connection to generate the low voltage power needed to power the ICs. Many commercial and residential electrical wirings lack a neutral connection. For example, many older homes built before 1970 do not include neutral connections. The wireless dimmer (e.g., wireless dimmer 40) described herein does not require a neutral connection and can therefore be used in a larger range of applications than traditional dimmers. For example, wireless dimmer 40 may be used in applications where no neutral connection is present and/or in applications where installing a neutral connection would be costly. Secondly, many traditional dimmers allow for local control of a dimming level. However, the wireless dimmer (e.g., wireless dimmer 40) described herein allows for remote control of a dimming level and/or coordination of multiple dimmers via wireless signals. Remotely controllable dimmers (e.g., wireless dimmer 40) may allow for lighting automation. For example, lights in a hotel room may be automatically dimmed when a guest leaves the room. Thirdly, different light sources require different power sources. For example, a magnetic induction lamp may be modeled as an inductor while an LED light may be modeled as a resistor. Traditional dimmers may not be able to power each light source. Instead, traditional dimmers may only work with a range of light sources. For example, a first traditional dimmer may only be compatible with an incandescent light, while a second traditional dimmer may only be compatible with an LED light. However, the wireless dimmer (e.g., wireless dimmer 40) described herein is compatible with any lighting source and can automatically adjust to supply the attached lighting source.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A modular dimmer assembly, comprising:
    a communications circuit configured to send and receive wireless communication;
    a control circuit configured to receive an AC input at a first pulse width and adjust the brightness of at least one lighting device in response to the communications circuit receiving a signal, by producing an AC output at a second pulse width;
    a power circuit comprising a flyback switch mode power supply (SMPS) and a capacitor, wherein the flyback SMPS charges the capacitor and the control circuit monitors a voltage of the capacitor to determine the second pulse width; and
    wherein the modular dimmer assembly is a two-wire device with no neutral connection.

2. The modular dimmer assembly of claim 1, wherein the communication circuit uses a Zigbee communications protocol.

3. The modular dimmer assembly of claim 1, wherein the at least one lighting device is one of a light emitting diode (LED), a compact fluorescent light (CFL), a fluorescent, an incandescent, or a halogen.

4. The modular dimmer assembly of claim 3, wherein the control circuit modifies the AC output based on the lighting device.

5. The modular dimmer assembly of claim 1, wherein the modular dimmer assembly couples to an existing light switch.

6. The modular dimmer assembly of claim 5, wherein the modular dimmer assembly functions in addition to an existing switching functionality of the existing light switch.

7. The modular dimmer assembly of claim 1, wherein the communications circuit wirelessly connects to a control device.

8. A method of controlling a modular dimmer assembly, comprising:
    receiving, by a communications circuit of the modular dimmer assembly, a wireless communication to dim a light;
    generating, by a control circuit of the modular dimmer assembly, a first AC output having a first pulse width, wherein the first AC output controls a flyback switch mode power supply (SMPS) to charge a capacitor, wherein the module dimmer assembly does not have a neutral connection;
    measuring, by a power circuit of the modular dimmer assembly, a voltage associated with the capacitor;
    calculating, by the control circuit, a second pulse width based on an algorithm using the voltage and the wireless communication; and
    generating, by the control circuit, a second AC output having the second pulse width.

9. The method of claim 8, wherein the wireless communication is a Zigbee communications protocol.

10. The method of claim 8, wherein the light is one of a light emitting diode (LED), a compact fluorescent light (CFL), a fluorescent, an incandescent, or a halogen.

11. The method of claim 10, wherein the algorithm further uses a type of the light.

12. The method of claim 8, wherein the modular dimmer assembly couples to an existing light switch.

13. The method of claim 12, wherein the method functions in addition to an existing switching functionality of the existing light switch.

14. The method of claim 8, wherein the communications circuit receives the wireless communication from a control device.

15. A dimmer to modify a light switch, the dimmer comprising:
    a coupling unit configured to integrate the dimmer with an AC power source and the light switch, the coupling unit consisting of a first connection and a second connection, the first connection configured to connect to a line source of the AC power source and the second connection configured to connect to a ground source of the AC power source, wherein the coupling unit does not have a neutral connection;
    a communications circuit configured to send and receive wireless communication;
    a control circuit configured to receive the AC power source at a first pulse width and adjust the brightness of at least one lighting device, in response to the communications circuit receiving a signal, by producing an AC output at a second pulse width; and
    a power circuit comprising a flyback switch mode power supply (SMPS) and a capacitor, wherein the flyback SMPS charges the capacitor and the control circuit monitors a voltage of the capacitor to determine the second pulse width.

16. The dimmer of claim 15, wherein the communications circuit uses a Zigbee communications protocol.

17. The dimmer of claim 15, wherein the at least one lighting device is one of a light emitting diode (LED), a compact fluorescent light (CFL), a fluorescent, an incandescent, or a halogen.

18. The dimmer of claim 17, wherein the control circuit modifies the AC output based on the lighting device.

19. The dimmer of claim 15, wherein the dimmer functions in addition to an existing switching functionality of the light switch.

20. The dimmer of claim 15, wherein the communications circuit wirelessly connects to a control device.

21. The modular dimmer assembly of claim 1, wherein the control circuit is configured to perform a calibration procedure comprising:
   powering the at least one lighting device at a first duty cycle;
   performing an operation using a voltage of the capacitor and a threshold value;
   in response to a first result of the operation, adjusting the first duty cycle; and
   in response to a second result of the operation, storing a value of the first duty cycle, wherein the value represents an extrema brightness level of the at least one lighting device.

22. The modular dimmer assembly of claim 21, wherein the calibration procedure further comprises calculating one or more intermediate brightness levels based on the extrema brightness level.

23. The modular dimmer assembly of claim 21, wherein the first operation includes comparing the capacitor voltage to the threshold value, and wherein the first result indicates that the capacitor voltage is greater than the threshold value.

24. The modular dimmer assembly of claim 23, wherein adjusting the first duty cycle includes increasing the first duty cycle.

25. The modular dimmer assembly of claim 23, wherein the second result indicates that the capacitor voltage is less than the threshold value.

26. The modular dimmer assembly of claim 21, wherein the value represents a maximum brightness that the modular dimmer assembly is capable of driving the at least one lighting device at.

27. The modular dimmer assembly of claim 21, wherein the control circuit performs the calibration procedure in response to powering on the modular dimmer assembly.

28. The modular dimmer assembly of claim 21, wherein the control circuit performs the calibration procedure in response to detecting a change in the at least one lighting device.

29. The modular dimmer assembly of claim 21, wherein the calibration procedure loops until the second result is achieved.

* * * * *